(12) United States Patent
Nett et al.

(10) Patent No.: US 7,617,919 B2
(45) Date of Patent: Nov. 17, 2009

(54) DRIVETRAIN FOR A MOTOR VEHICLE

(75) Inventors: Hans-Peter Nett, Adenau (DE); Werner Hoffmann, Siegburg (DE); Jan Potulski, Cologne (DE)

(73) Assignee: GETRAG Driveline Systems GmbH, Cologne (DE)

( * ) Notice: Subject to any disclaimer, the term of this patent is extended or adjusted under 35 U.S.C. 154(b) by 0 days.

(21) Appl. No.: 11/648,973

(22) Filed: Jan. 3, 2007

(65) Prior Publication Data

US 2007/0175721 A1   Aug. 2, 2007

Related U.S. Application Data

(63) Continuation of application No. PCT/EP2005/007359, filed on Jul. 7, 2005.

(30) Foreign Application Priority Data

Jul. 8, 2004   (DE) .................. 10 2004 033 439

(51) Int. Cl.
*F16D 25/12* (2006.01)
*F15B 7/06* (2006.01)

(52) U.S. Cl. .................. 192/52.4; 60/578; 91/29; 192/85 AA (58) Field of Classification Search .............. 192/52.4; 60/578
See application file for complete search history.

(56) References Cited

U.S. PATENT DOCUMENTS

| | | | | |
|---|---|---|---|---|
| 3,084,851 A | * | 4/1963 | Schibbye et al. | ......... 418/201.1 |
| 3,174,601 A | * | 3/1965 | Whinery et. al. | .............. 192/61 |
| 3,228,195 A | * | 1/1966 | Brent et al. | .................... 60/578 |
| 4,833,971 A | * | 5/1989 | Kubik | ............................. 91/29 |
| 5,720,372 A | * | 2/1998 | Shino et al. | ............. 192/85 CA |
| 6,013,140 A | * | 1/2000 | Simoneaux | .................. 148/320 |
| 6,241,486 B1 | * | 6/2001 | Sloteman | ..................... 417/370 |
| 7,214,036 B2 | * | 5/2007 | Yoshimura | ............... 418/201.1 |
| 2002/0148699 A1 | | 10/2002 | Mack et al. | |
| 2004/0159523 A1 | * | 8/2004 | Duan et al. | ............. 192/85 CA |

FOREIGN PATENT DOCUMENTS

| | | |
|---|---|---|
| DE | 100 56 004 A1 | 3/2002 |
| DE | 101 09 467 A1 | 9/2002 |
| WO | WO 01/16508 A1 | 3/2001 |
| WO | WO 03031821 A1 * | 4/2003 |

\* cited by examiner

*Primary Examiner*—Rodney H Bonck
(74) *Attorney, Agent, or Firm*—Knobbe, Martens, Olson & Bear, LLP (57) ABSTRACT

A drivetrain for a motor vehicle has a friction clutch for transmitting drive torque for the motor vehicle and has an actuator arrangement for actuating the friction clutch. The actuator arrangement has a first actuator which is designed to close the friction clutch quickly with little force expenditure in order to thus quickly close up the play which is present in the open state of the friction clutch. The actuator arrangement has a second actuator which is designed such that, with a small stroke, it applies a large force for actuating the friction clutch in order to keep the friction clutch closed with little energy expenditure.

11 Claims, 5 Drawing Sheets

DRIVETRAIN FOR A MOTOR VEHICLE

CROSS-REFERENCE TO RELATED APPLICATIONS

This application is a continuation application of international patent application PCT/EP 2005/007359 filed Jul. 7, 2005 and claims priority under 35 U.S.C. §119 from German patent application DE 10 2004 033 439 filed Jul. 8, 2004.

BACKGROUND OF THE INVENTION

The present invention relates to a drivetrain for a motor vehicle, having a friction clutch for transmitting drive torque for the motor vehicle and having an actuator arrangement for actuating the friction clutch.

The use of friction clutches in drivetrains has long been known. For many years, dry friction clutches have been used in conventional manual shift transmissions as starting and separating clutches, to name just one example.

For a number of years, there has also been a trend towards automatic drivetrains in which friction clutches are opened and closed automatically. This relates on the one hand to the starting and separating clutches of automatic shift transmissions. The so-called dual-clutch transmissions generally use wet-running multi-disc clutches for the two separating clutches.

Friction clutches are also increasingly used in all-wheel-drive systems. In vehicles with all-wheel-drive, a distinction is made between clutch-controlled torque distribution and differential-controlled torque distribution. In clutch-controlled systems, one axle is generally driven at all times, and the second axle can be connected. Here, friction clutches are used, for example in the so-called "Haldex system" in which the second axle is connected on demand by means of a multi-disc friction clutch of said type. In differential-controlled systems, a friction clutch can, as a differential lock, be connected in parallel to the differential which provides a fixed-ratio torque distribution between the two driven axles. Friction clutches such as multi-disc friction clutches are also used here, since locks of said type can also be automatically actuated while travelling and under load in order to improve propulsion.

All-wheel-drive locks of said type, which can be activated or deactivated independently of differential speeds at any time, are also called "active" locks. In vehicles which are regularly also used in normal road traffic, it is important that such lock systems are compatible with safety systems such as ABS and ESP. Since a closed differential lock greatly influences the driving behaviour, a lock of said type must be capable of opening or releasing quickly. In addition, a differential lock of said type should be open in the non-actuated state ("fail safe").

The actuator arrangements for friction clutches of said type comprise, on the one hand, solutions based on an electric motor. Here, the disc stack is actuated by means of a ball ramp which is in turn actuated electromotively via a small gear mechanism. The application force is provided by means of the mechanical step-up ratio (that is to say the toothing of the gear mechanism and the ball ramp).

Alternatively, all-wheel-drive clutches of said type can be hydraulically actuated. Here, it is not unusual to provide, in the hydraulic circuit, an electrically driven pump and a pressure accumulator for maintaining a high actuating pressure. Such additions often entail a high expenditure on valves and other hydraulic components in order to be able to meet the requirements stated in the introduction.

It is not unusual nowadays for friction clutches for all-wheel-drive vehicles to be operated for relatively long periods in the closed state, for example in off-road operation. Here, active periods of one hour are not uncommon. In the above-described solution based on an electric motor in connection with a mechanism and a ball ramp, this leads to the electric motor heating up, since a very high current consumption (in the region of 30 A and above) is required to keep the clutch in the closed state. As a result of the heating effect, the actuator arrangement has a low degree of efficiency. The same problem occurs if a friction clutch is actuated directly by means of a pump.

BRIEF SUMMARY OF THE INVENTION

It is an object of the present invention to specify a drivetrain of the type stated in the introduction in which a good degree of efficiency is obtained in the highest possible number of operating states, and a long active duration is possible with low energy requirements.

According to one aspect of the invention, there is provided a drivetrain for a vehicle, as stated in the introduction, in that the actuator arrangement has a first actuator which is designed to close the friction clutch quickly with little force expenditure in order to thus quickly close up the play which is present in the open state of the friction clutch, and a second actuator which is designed such that, with a small stroke, it applies a large force for actuating the friction clutch in order to keep the friction clutch closed with little energy expenditure.

The invention is based on the following finding. In actuating friction clutches, in particular multi-disc clutches, two phases are to be observed. The first phase is the closing movement. Here, the clearance (air clearance) between the individual plates is closed up. The second phase is the torque build-up phase.

As a result of the measure of providing two actuators instead of only one actuator and of optimizing said actuators in each case to one of the two phases, it is possible to obtain a considerably higher overall degree of efficiency of the entire system. In the first phase, in which the air clearance is overcome, a relatively high volume flow rate is required at relatively low pressure. In contrast, the second phase requires a high pressure and only a small volume. As a result of the corresponding design of the two actuators of the actuator arrangement, it is possible to provide that the required current consumption of an electric motor for driving the two actuators is less than 10 A, for example 5 A, even in the closed state of the friction clutch. This improves the degree of efficiency and avoids thermal overheating of the electric motor.

The friction clutch of the drivetrain can be used either as a "hang-on" clutch in clutch-controlled systems, but can also be used as a lock for differentials. This can on the one hand be a longitudinal lock which bypasses a differential between the front and the rear axle. However, it can also be a transverse lock which can lock a differential between the left-hand and right-hand wheels of an axle.

An efficient, compact and highly precise and fast actuating arrangement is obtained overall.

It is particularly advantageous for the actuator arrangement to have an electric motor and a gear mechanism with two different transmission ratios, the first actuator having the electric motor and the gear mechanism with the first transmission ratio, and the second actuator having the electric motor and the gear mechanism with the second transmission ratio.

This measure ensures that the different requirements in the two phases in the actuation of the friction clutch can be met efficiently by means of the different transmission ratios of the gear mechanism. Since a switch between the transmission ratios is generally made under load, suitable synchronization means are generally necessary.

According to an alternative, further preferred refinement, the actuator arrangement has a first pump and a second pump which have different hydraulic transmission ratios and can be directly connected to the friction clutch, the first actuator having the first pump, and the second actuator having the second pump.

In said preferred refinement, the actuator arrangement is provided by a hydraulic dual pump for directly controlling the friction clutch. Since the two pumps have different hydraulic transmission ratios, it is possible to provide an actuator arrangement in which the electric motor requires a holding torque of only <1 Nm, in particular <0.25 Nm, for a system pressure of 50 bar. It is accordingly also the case here that a current consumption of only less than 10 A, in particular less than 5 A, is necessary.

It is particularly advantageous here for the first pump and the second pump to be driven together by one motor.

This reduces the design expenditure for the "dual pump".

According to a further preferred refinement, the outlet of the first pump and the outlet of the second pump are connected to one another at a connecting point which is connected to the friction clutch.

In said refinement, the two pumps operate in parallel. The volume flow rates of both pumps can be guided to the friction clutch in particular when a high volume flow rate is required.

Here, it is particularly advantageous if a non-return valve is arranged between the first pump and the connecting point.

This measure makes it possible to generate two different pressure levels between the first pump and the second pump. For example, the second pump can be responsible for the phase for actuating the friction clutch at high pressure with a low volume flow rate. In this case, it is possible to provide, by means of the non-return valve, that only the second pump is connected to the friction clutch, while the first pump idles in a "low pressure circuit".

According to a further preferred refinement, the outlet pressure of the first pump is limited to a limit pressure by means of a pressure limiting arrangement.

Since the first pump is generally designed to provide a high volume flow rate but not a high pressure, said measure makes it possible to establish a low pressure circuit.

The pressure limiting arrangement can be formed by a passive pressure limiting valve. However, it can also be formed by an actively-regulated valve arrangement.

Here, it is particularly advantageous for the limit pressure to define the switching pressure above which only the outlet of the second pump is connected to the friction clutch.

This leads to a simple hydraulic design. When the limit pressure is reached, a pressure difference is provided between the outlets of the two pumps. This causes the non-return valve to block, so that the first pump is separated from the connecting point and therefore from the friction clutch. As a result, the first pump idles, while the second pump, at a low volume flow rate, provides the comparatively high pressure for closing and for building up torque.

It is also preferable overall if the friction clutch can be switched to an unpressurized state by means of an electrically controlled valve.

A valve of said type can, for example, be arranged between the connecting point and a tank.

This provides that the friction clutch can be switched to an unpressurized state quickly and reliably ("fail safe") in order, for example, to ensure compatibility with regulating systems such as ABS and ESP.

According to a further preferred refinement, the friction clutch is connected via an orifice to a tank.

This makes it possible to prevent pressure peaks in the line to the friction clutch.

It is also preferable overall if the first and second pumps are integrated in a housing which can be flanged directly to an electric drive motor.

This forms a compact actuator arrangement with few components.

Here, it is also preferable for the pressure limiting arrangement and the non-return valve to likewise be integrated into the housing.

In this way, the actuator arrangement can, in particular, be pre-assembled, and can therefore be easily installed in the vehicle at a later time.

It is particularly advantageous for the two pumps to be integrated into one pump. This leads to a particularly cost-effective and compact design.

It is particularly advantageous for the integrated pump to be embodied as a planetary gearwheel pump and to have two pressure kidneys which are matched to the first and second pumps respectively.

It is also possible to integrate the actuator arrangement completely or partially into an axle housing.

According to another aspect of the invention, there is provided a drivetrain for a motor vehicle, as stated in the introduction, in that the actuator arrangement has a first pump and a second pump, the first pump is designed to displace a larger quantity at a lower pressure than the second pump, and the first and second pumps are embodied as rotary screw pumps.

The invention is based on the finding that rotary screw pumps can surprisingly be used in a highly advantageous manner in this field. Rotary screw pumps can be easily implemented even if there is only limited installation space available. Here, said rotary screw pumps distinguish themselves primarily by their ability to withstand high rotational speeds, making it possible to use small, economical drive motors. In addition, it is possible to configure rotary screw pumps for various characteristics by modifying their geometry. This applies even more since the characteristics can be adapted preferably by changing only the rotor (central rotor) while maintaining the outer geometry. The invention accordingly presents a drivetrain having a robust actuator arrangement which is easy to configure and easy to produce.

It is pointed out that the previously described features can also be advantageously used in connection with these variants.

It is particularly advantageous for the first pump to have a first rotor with a first thread and for the second pump to have a second rotor with a second thread, with the first thread having a larger pitch and/or a larger radial depth than the second thread.

This makes it simple to provide the different design of the two pumps. A relatively large pitch of the thread leads to a larger quantity of fluid being displaced per unit time at a lower pressure than would be the case for a relatively low pitch. In addition, the characteristic can vary over the depth of the (worm) thread. A relatively low radial depth can be provided, for example, by reducing the outer radius of the thread. It is however also possible, for example, preferably while maintaining the outer radius, to increase the inner radius of the thread (the core radius) and therefore to reduce the effective radial depth of the thread. This makes it possible to simply and highly precisely adjust the rotary screw pump characteristic.

According to a further preferred refinement, the first and second pumps obtain a fluid, which is to be displaced, from a common tank.

This further simplifies the design of the drivetrain.

According to an alternative, further preferred refinement, a fluid outlet of the first pump and a fluid inlet of the second pump are connected to one another.

Here, with regard to the fluid inlet and the fluid outlet for the pumps, it is to be understood that the pressure at the fluid outlet is typically higher than at the fluid inlet in pump mode. If a fluid which has already been compressed by the first pump—that is to say has effectively undergone pre-compression—is conducted to the fluid inlet of the second pump, the torque required to drive the second pump is reduced since the pressure difference of the second pump (high pressure pump) is reduced by the pressure of the first pump (low pressure pump). This allows a more economical design of drive motor and/or an increase in the power of the second pump.

The first and second pumps are advantageously driven together by one motor, in particular by means of a common motor shaft.

This reduces the design expenditure for the arrangement of the first and second pumps (dual pump). This is the case in particular when the drive is provided by means of a common motor shaft. The rotors of the pumps are preferably fixedly arranged on the common motor shaft or are formed in one piece with the motor shaft.

It is also advantageous if the first and/or second pumps have a central rotor and at least one side rotor.

This increases the efficiency of the respective pump. The advantage manifests itself in particular in the second pump, since the latter provides a higher pressure than the first pump.

According to a preferred refinement of the invention, the side rotor is driven by the central rotor.

This makes it possible to provide the drive of the side rotor in a simple way.

It is self-evident that the features mentioned previously and those to be explained in the following can be used not only in the respectively specified combination but also in other combinations or individually without departing from the scope of the present invention.

BRIEF DESCRIPTION OF THE SEVERAL VIEWS OF THE DRAWING

Exemplary embodiments of the invention are illustrated in the drawing and are explained in more detail in the following description. In the drawing.

DETAILED DESCRIPTION OF THE INVENTION

Figure 1:
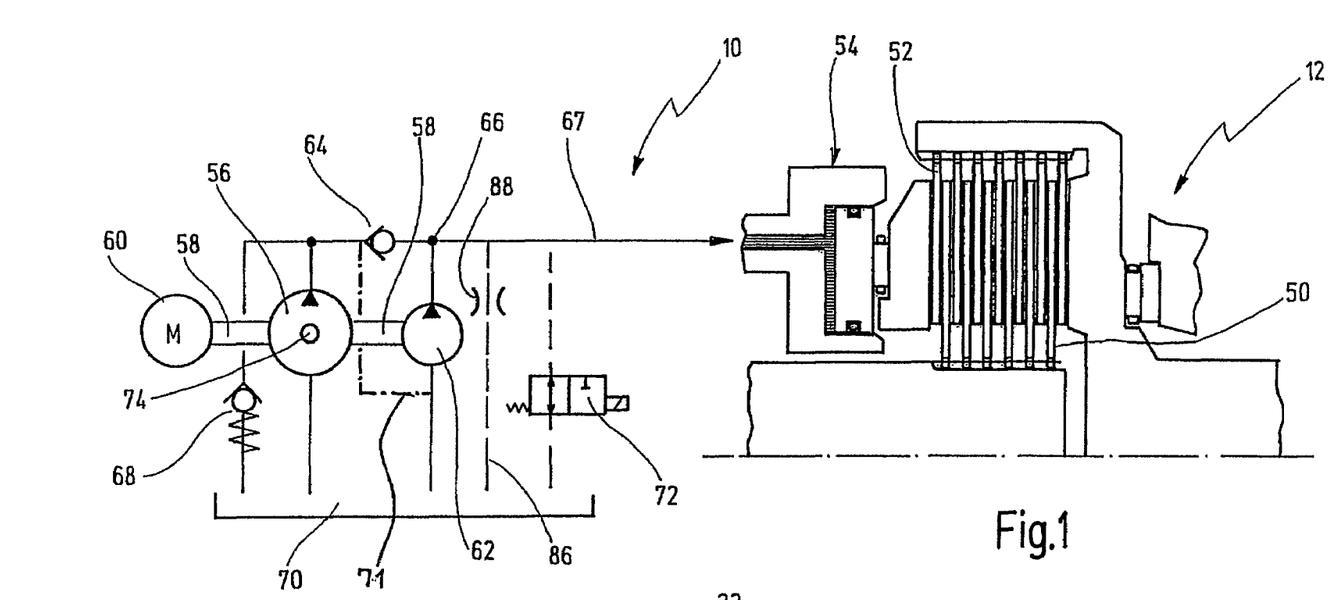
FIG. 1 is a schematic illustration of an actuator arrangement for actuating a friction clutch in a drivetrain according to a first embodiment of the present invention.

In FIG. 1, an actuator arrangement for actuating a friction clutch 12 is denoted generally by 10. The actuator arrangement 10 and the friction clutch 12 can be part of a drivetrain 22 of a motor vehicle 20 which is illustrated schematically in FIG. 1A.

Figure 1A:
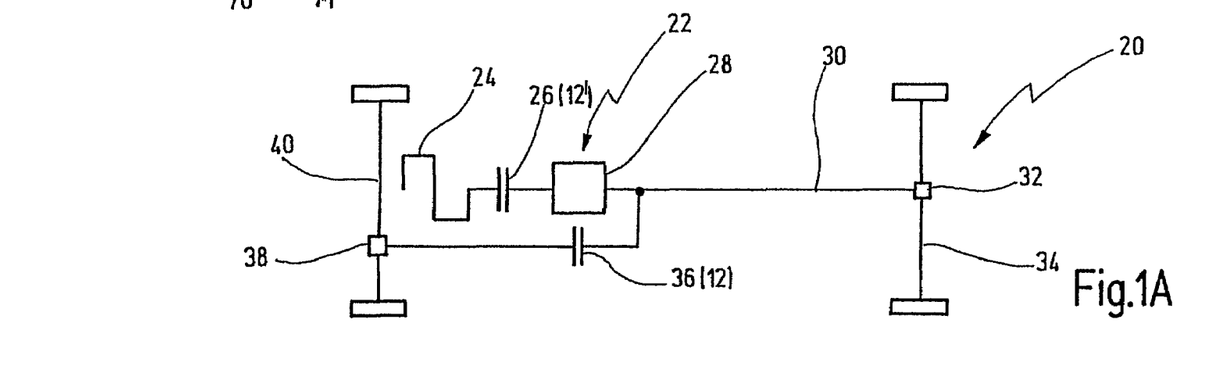
FIG. 1A shows a vehicle having a drivetrain in which the actuator arrangement of FIG. 1 can be provided.

The drivetrain 22 of the motor vehicle 20 has a drive motor, such as an internal combustion engine 24, and a starting and separating clutch 26. The output member of the starting and separating clutch 26 is connected to a multi-step transmission 28 for providing a plurality of gears (or to a continuously variable transmission). The output of the transmission 28 is connected via a cardan shaft 30 to a rear axle differential 32 whose output members are connected to the wheels of a rear axle 34.

The output of the transmission 28 is also connected via a friction clutch 36 to a front axle differential 38. The output members of the front axle differential 38 are connected to wheels of a front axle 40.

The illustrated drivetrain 22 is a clutch-controlled all-wheel-drive type. The rear axle 34 of the vehicle 20 is permanently driven. Here, the friction clutch 36 is generally open. If required (for example when there is a speed difference between the rear axle 34 and the front axle 40), the friction clutch 36 is closed, so that some of the drive power is guided to the front axle 40.

In FIG. 1A, it is indicated that the two clutches 26, 36 could each also be denoted by 12 and 12' respectively, since they can for example be provided by a friction clutch 12 as illustrated in FIG. 1.

It is self-evident that the illustrated drivetrain 22 is specified only by way of example. Instead of a "hang-on" solution as shown in FIG. 1A, it is also possible for the drivetrain to have, for example, a differential-controlled all-wheel-drive system, with the torque distribution between the front axle and the rear axle generally being set at a fixed ratio as a result of a differential (for example a TORSEN® differential or open differential). Here, it is possible to provide, in particular for an open differential, an additional torque lock in the form of a friction clutch, which can likewise be realized as the friction clutch shown in FIG. 1. The same applies to the rear axle differential 32 and the front axle differential 38. Said differentials can also be provided with additional locks in the form of friction clutches 12.

Said basic design of a drivetrain 22 of a motor vehicle 20 is generally known.

For the friction clutches 12, 26, 36, it is possible in particular for wet-running multi-disc clutches to be used, as illustrated schematically in FIG. 1.

A multi-disc clutch of said type has inner plates 50 and outer plates 52 which engage in one another. The inner plates 50 are for example connected to an input member of the friction clutch 12, and the outer plates 52 to an output member. In the unloaded state of the plates 50, 52, the input member and the output member can rotate relative to one another. The plates 50, 52 can be pressed together axially by means of a piston/cylinder arrangement 54 in order to connect the input member and the output member to one another in a frictionally locking fashion. In multi-disc clutches of said type, it is also mostly possible to regulate or adjust slip states which exist between the open and closed states.

The piston/cylinder arrangement 54 is connected to the actuator arrangement 10.

The actuator arrangement 10 has a first pump 56 which is designed for large volume flow rates and low pressure. The first pump 56 is driven by means of an output shaft 58 of an electric motor 60.

A second pump 62 is driven by means of the same output shaft 58. The second pump 62 is designed for high pressures and low volume flow rates.

The outlet of the first pump 56 is connected by means of a non-return valve 64 to a connecting point 66. The outlet of the second pump 62 is connected directly to the connecting point 66. The connecting point 66 is connected directly to the piston/cylinder arrangement 54 via a connecting line 67.

The outlet of the first pump 56 is also connected via a pressure limiting valve 68 to a tank 70, from which the first and second pumps 56, 62 draw the fluid which is to be displaced or pumped.

It is also alternatively (or if appropriate additionally if using a further non-return valve) possible to connect the outlet of the first pump 56 to the inlet of the second pump 62 via a connecting line 71 (illustrated by a dash-dotted line).

The pressure limiting valve 68 can, as illustrated, be a passive pressure limiting valve. It can however also be embodied as an active valve in order to once again considerably increase the efficiency.

The connecting point 66 or the line 67 to the piston/cylinder arrangement 54 is optionally connected to the tank 70 via a shut-off valve 72.

In operation, the friction clutch 12 is initially open. The motor 60 is at standstill or rotates at an idle speed in order to prevent the pressure in the connecting line 67 between the connecting point 66 and the piston/cylinder arrangement 54 from falling to too great a degree.

If the friction clutch 12 is to be closed, the motor 60 starts or the speed of the motor 60 is increased. As a result, both pumps 56, 62 provide a feed. Here, the first pump 56 feeds a large volume flow rate which achieves that the air clearance of the plates 50, 52 is quickly overcome. At the end of said first phase of closing the friction clutch 12 (at a relatively low pressure in the line 67), the pressure limiting valve 68 opens, so that the first pump 56 discharges into the tank 70 via the pressure limiting valve 68. The motor 60 continues to be driven, and the pump 62 generates an ever increasing pressure, also as a result of the pressure point of the friction clutch 12 being reached. As a result, the non-return valve 64 is closed, so that hydraulic fluid is prevented from flowing back from the "high pressure circuit" into the low pressure circuit (comprising the first pump 56 and the pressure limiting valve 68).

In the following, the pressure in the connecting line 67 is controlled or regulated by means of the second pump 62. Since the second pump 62 is designed for a low volume flow rate but a high pressure, frictional locking of the friction clutch 12 can be provided with a relatively low current consumption of the electric motor 60. At a system pressure of 50 bar, the electric motor 60 requires a holding torque of, for example, <1 Nm, in particular <0.25 Nm. This means that the electric motor 60 requires a current consumption of less than 10 A, in particular less than 5 A.

This results overall in a high degree of efficiency of the actuator arrangement 10. As a result of the direct connection of the two pumps 56, 62 to the friction clutch 12 (or the piston/cylinder arrangement 54 for actuating the friction clutch 12), the economical disadvantages of hydraulic solutions, which require complex valve technology and pressure accumulators, are avoided. A solution is provided which is considerably more cost-effective than a purely electromotive solution (for example by means of ball ramps). A hydraulic actuator arrangement is also generally simpler to accommodate in the vehicle. The electric motor 60 for actuating the pumps 56, 62 can be of considerably smaller dimensions than an electric motor which actuates the friction clutch by means of mechanisms or the like.

The overall result is an efficient, compact and highly precise as well as fast actuating arrangement for actuating the friction clutch 12.

In normal operation, the electric motor 60 is switched to a currentless state in order to open the friction clutch 12. The system pressure in the piston/cylinder arrangement 54 flows back through the second pump 62 into the tank 70. Since the return flow in the second pump 62 is in the opposite direction compared to the flow during filling (suction and pressure sides exchanged), the electric motor 60 rotates counterwise to the drive direction.

The return flow to the first pump 56 is prevented by the non-return valve 64. So that the first pump 56 does not generate a vacuum, the inner rotor of the first pump 56 is connected via an overrunning clutch 74 (indicated schematically in FIG. 1) to the output shaft 58. In order to accelerate the opening of the friction clutch 12, the electric motor 60 can be supplied with reverse polarity current, so that the second pump 62 assists in the evacuation to the tank 70.

The optional shut-off valve 72 can, as illustrated, be embodied as a 2/2-directional control valve and be electrically actuated. For example, the actuation of the clutch 12 can be enabled by means of said shut-off valve 72 by virtue of the shut-off valve 72 being displaced into the locking position (not illustrated in FIG. 1) against the force of a preloaded spring. If the control unit fails or the friction clutch 12 is to be opened quickly in a manner controlled by the control unit, the shut-off valve 72 is displaced by means of the spring into the shut-off position, illustrated in FIG. 1, in which the connecting line 67 is connected directly to the tank 70. As a result, the pressure within the piston/cylinder arrangement 54 is dissipated immediately and the friction clutch 12 is opened. This is particularly important for faultless functioning, in particular with regard to a fail safe approach.

A line 86 which leads from the high pressure side of the second pump 62 through an orifice 88 and into the tank 70 is indicated by means of a dashed line. This design is optional and contributes to a dissipation of pressure peaks on the high pressure side.

Figure 2:
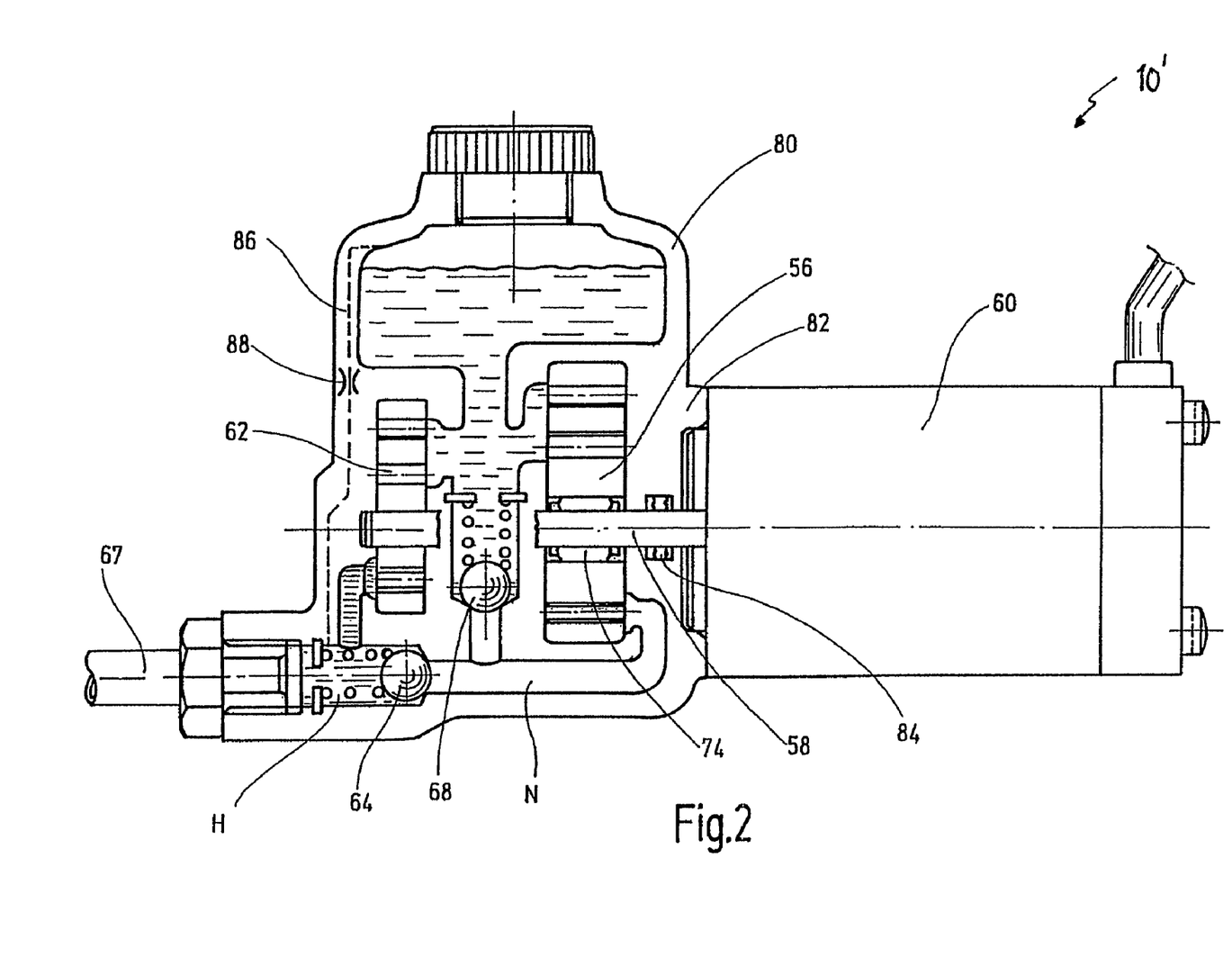
FIG. 2 shows a schematic section view through an actuator arrangement for a friction clutch in a drivetrain according to a further embodiment of the present invention.

FIG. 2 shows an alternative embodiment of an actuator arrangement 10' for actuating a friction clutch in a drivetrain according to a further embodiment of the invention. In terms of function and design, the actuator arrangement 10' corresponds largely to the actuator arrangement 10 of FIG. 1. Identical elements are therefore provided with the same reference symbols. In addition, only the differences are described in the following.

The actuator arrangement 10' is provided as a compact unit, which can be pre-assembled, comprising the electric motor 60 and a housing 80 which accommodates the functionally relevant hydraulic sections of the actuator arrangement 10'.

The housing 80 has a flange section 82 which can be connected to an end side of the housing of the electric motor

60. Here, the output shaft 58 of the electric motor 60 extends, in a manner sealed off by means of a shaft seal 84, into the interior of the housing.

The shaft 58 of the electric motor 60 drives the first pump 56 and the second pump 62 which are aligned coaxially with respect to one another.

The two pumps are fed from a tank 70 situated above them. The pressure limiting valve 68 for establishing the low pressure circuit N is arranged between the two pumps 56, 62. The non-return valve 64 is arranged within the housing, substantially between the second pump 62 and a port for attaching the connecting line 67. A high pressure circuit H is established between the first pump 62 and the non-return valve 64.

The housing 80 also has a lid (not illustrated in any more detail) for refilling hydraulic fluid into the tank 70.

It is finally indicated in FIG. 2 that the high pressure circuit H can be connected via a line 86 within the housing to an orifice 88 which opens towards the tank 70. An orifice 88 of said type can be provided to dissipate pressure peaks in the high pressure circuit H.

The concept of a dual pump, in which one pump is designed for a high volume flow rate at a low pressure and the other pump is designed for a low volume flow rate at a high pressure, can also be used, in particular in the design embodiment of FIG. 2, for other applications in motor vehicle technology. For example, a dual pump of said type can be used in a dual clutch transmission, with the volume pump being responsible for overcoming the clearance of the two clutches of the dual clutch transmission and for cooling and lubrication. The high pressure pump would be designed here for the regulating phase during torque transmissions via the clutches.

Since it is preferable to provide direct actuation of the respective friction clutch, it would be necessary here to provide one unit of said type (motor+dual pump) per clutch of the dual clutch transmission.

The use of the dual pump for the friction clutches of a dual clutch transmission is considered here as a separate invention.

The first and second pumps are generally advantageously embodied as pumps having encircling displacement bodies, in particular as rotor pumps, particularly preferably as gearwheel pumps or planetary gearwheel pumps (cf. for example DE 100 10 170 A1).

Figure 4:
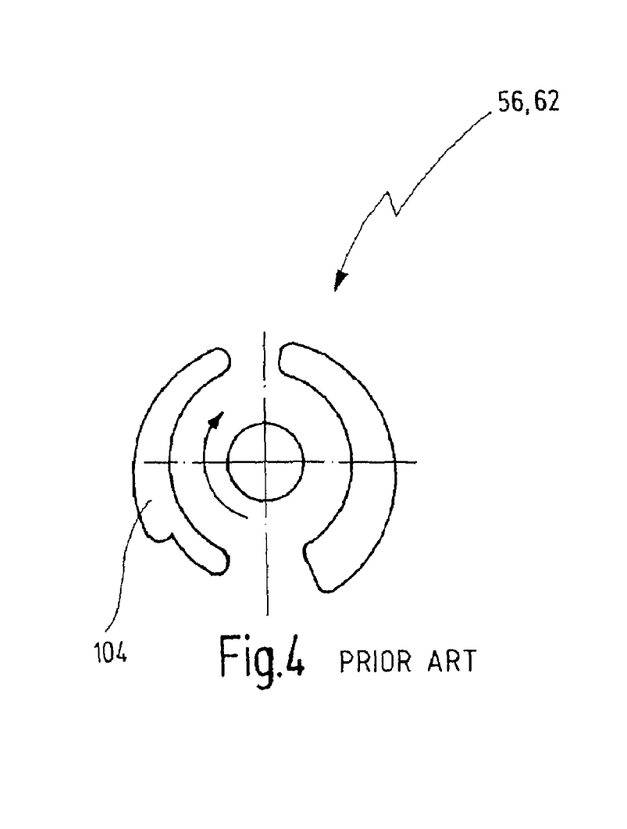
FIG. 4 is a schematic illustration of a pump according to the prior art.

FIG. 4 shows, in schematic form, the conventional pressure kidney shape 104 provided in a planetary gearwheel pump. It is for example possible to provide the first and second pumps 56, 62 in each case as a separate pump with a pressure kidney shape of said type.

Figure 3:
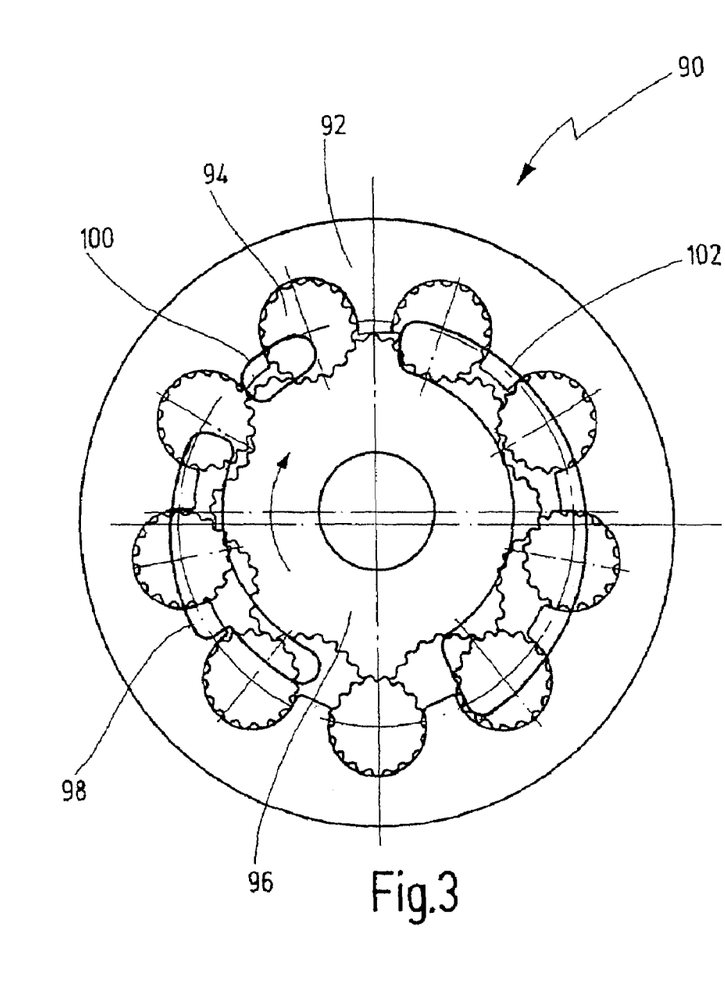
FIG. 3 is a schematic illustration of an integrated dual pump.

It is alternatively possible, as illustrated in FIG. 3, to combine the two pumps 56, 62 into one pump having a special rotor set as illustrated schematically at 90.

The integrated pump 90 is embodied as a planetary gearwheel pump. The pump 90 has a housing 92 in which a plurality of gearwheels 94 is mounted so as to be rotatable. Here, the gearwheels 94 are embodied as 'planets'. The pump 90 also has a rotor 96 with a star shape. The rotor 96 likewise has a toothing on the outer periphery, and rotates in the direction of the arrow.

Here, a medium which is to be pumped is sucked via a suction kidney 102. A first pressure kidney 98 and a second pressure kidney 100 are additionally provided in the housing 92.

The first pressure kidney 98 is assigned to the first pump 56. The second pressure kidney 100 is assigned to the second pump 62.

It can be seen that a comparatively high volume flow rate can be fed via the first pressure kidney 98, whereas only a low volume flow rate, but at a relatively high pressure, is output via the second pressure kidney 100.

An integrated dual pump 90 of said type makes a very cost-effective and particularly compact design possible.

In the following, the particular advantages of the pumps 56, 62 being embodied as rotary screw pumps are explained.

Figure 5:
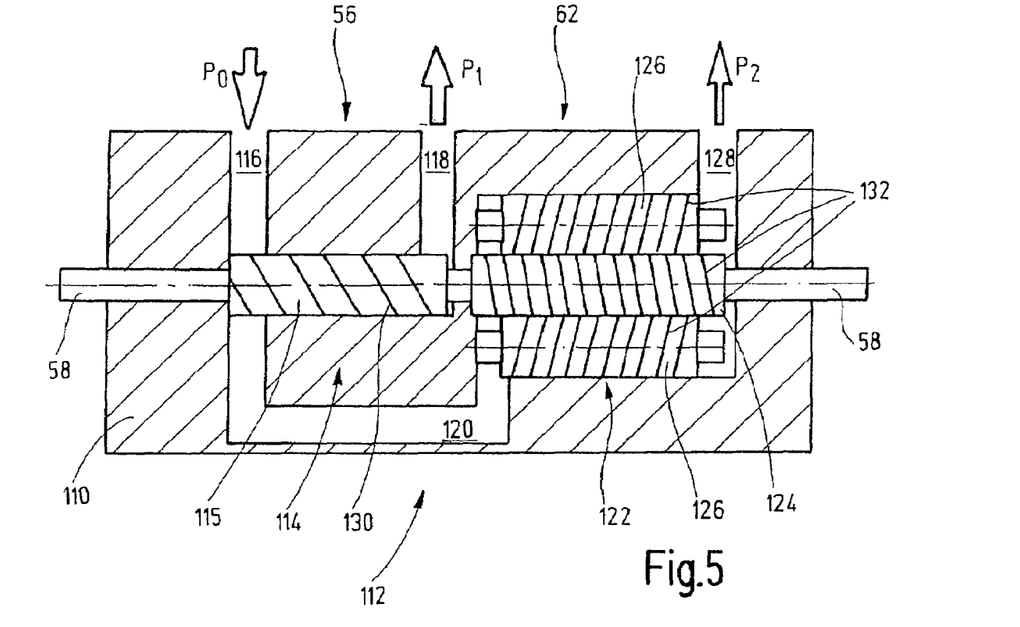
FIG. 5 shows a schematic section view through an arrangement of first and second pumps (dual pump) for a friction clutch in a drivetrain according to a further embodiment of the present invention.

FIG. 5 shows, in a schematic illustration, an arrangement of the first and second pumps 56, 62 as a dual pump 112 in a housing 110. Here, the first pump 56 has a first rotor arrangement 114, here a rotor 115, which displaces and compresses a fluid from a first fluid inlet 116 to a first fluid outlet 118. Here, the fluid is sucked from the tank 70 at a pressure $P_0$, generally ambient air pressure, and partially leaves the first pump 56 at an increased pressure $P_1$ ($P_0<P_1$). A further part of the fluid sucked from the tank 70 passes to the second fluid inlet 120 of the second pump 62 which has a second rotor arrangement 122 comprising a central rotor 124 and two side rotors 126. Here, it can be seen that the first rotor 115 and the central rotor 124 are arranged on a common motor shaft 58. Fluid is displaced and compressed by the second rotor arrangement 122 from the second fluid inlet 120 to a second fluid outlet 128, and leaves the second pump 62 there at a pressure $P_2$. Here, $P_1<P_2$, though the volume flow rate at the first fluid outlet 118 is regularly higher than at the second fluid outlet 128. This is achieved, as illustrated schematically in FIG. 5, in that a thread 130 of the rotor 115 has a larger pitch than the threads 132 of the rotors 124, 126.

Figure 6:
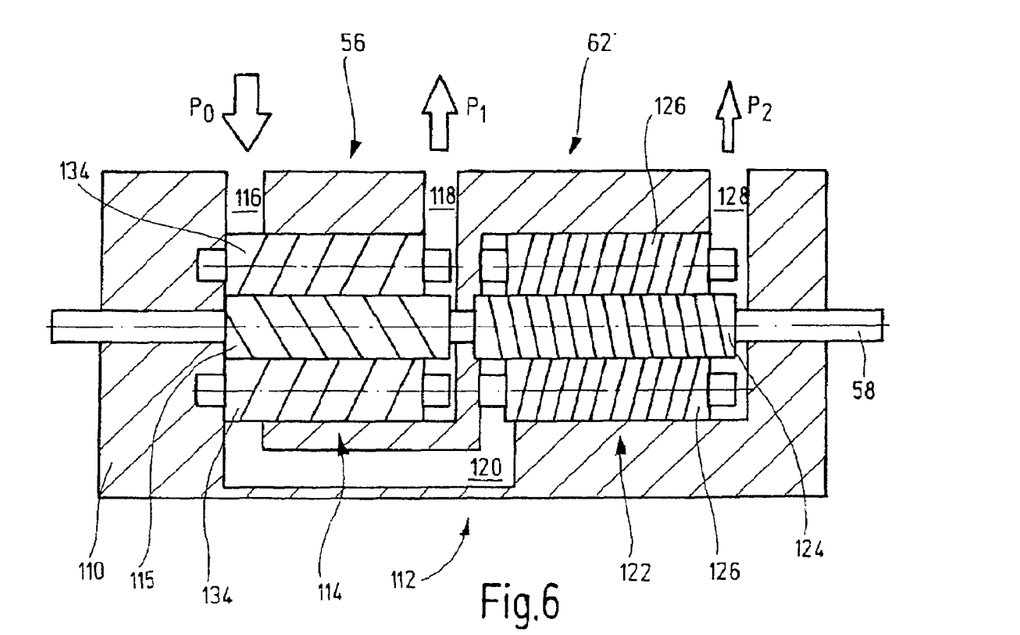
FIG. 6 shows a schematic section view through a dual pump according to a further embodiment of the present invention.

FIG. 6 shows a further exemplary embodiment. The statements made regarding FIG. 5 are also fundamentally applicable here, and identical reference symbols are used again here with the same meaning. The difference from FIG. 5 is that the first rotor arrangement 114 now also has side rotors 134 in addition to the (central) rotor 115. This increases the power capacity of the first pump 56.

Figure 7:
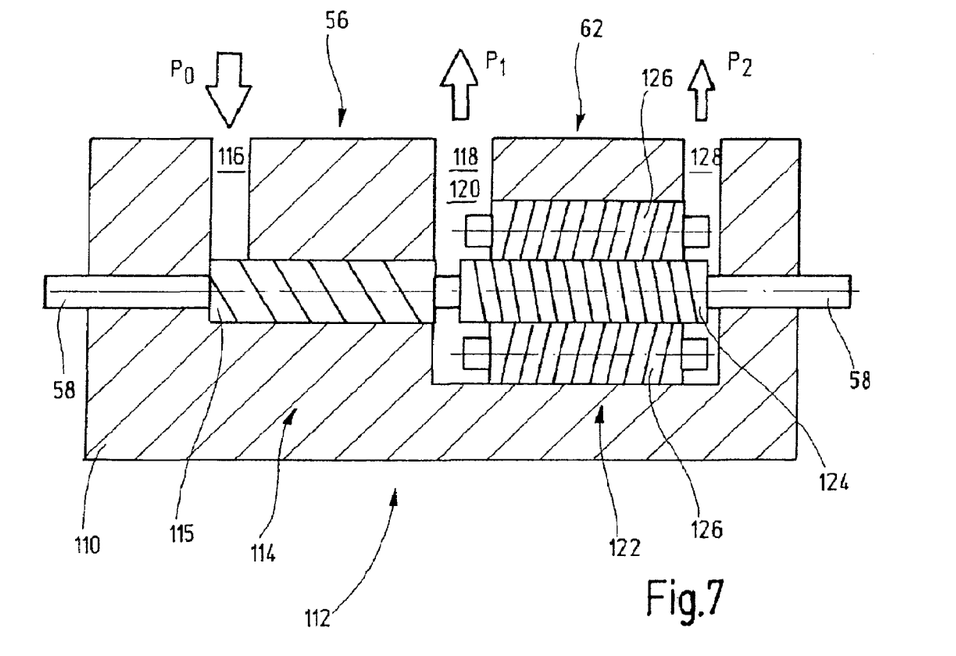
FIG. 7 shows a schematic section view through a dual pump, having pre-compression for the second pump, according to a further embodiment of the present invention.

FIG. 7 shows a further exemplary embodiment which constitutes a further modification of the dual pump 112 of FIG. 5. The statements regarding FIG. 5 are therefore correspondingly applicable with the previously introduced reference symbols being maintained. While, in FIG. 5, the first fluid inlet 116 and the second fluid inlet 120 are directly connected to one another, in the exemplary embodiment of FIG. 7, there is a direct connection between the first fluid outlet 118 and the second fluid inlet 120. This means that a fluid which has already been pre-compressed by the first pump 56 is present at the second fluid inlet 120 of the second pump 62. This reduces the torque required to provide drive, since the pressure difference of the second pump 62 (high pressure pump) is reduced by the pressure of the first pump 56 (low pressure pump). Said variant of the feeding arrangement of the second pump 62 is illustrated in FIG. 1 by means of the dash-dotted line 71.

Figure 8:
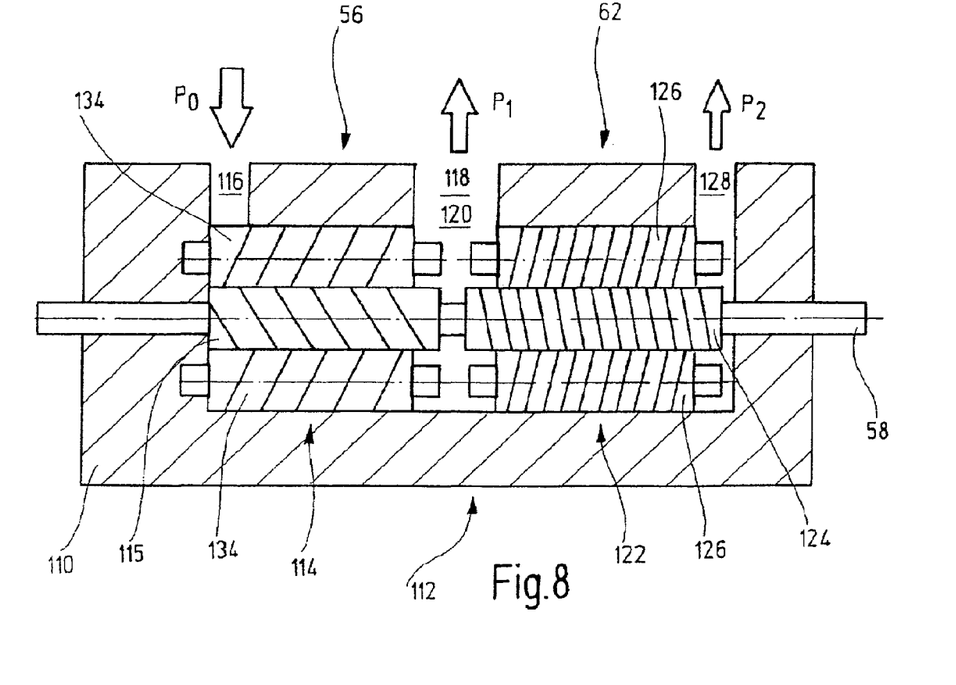
FIG. 8 is a schematic illustration of a dual pump, having pre-compression for the second pump, according to a further embodiment of the present invention.

FIG. 8 shows a further exemplary embodiment which constitutes a variation of the exemplary embodiment of FIG. 7. Here, the first rotor arrangement 114 has been expanded to include side tubes 134 in order to increase the power capacity of the first pump 56.

What is claimed is:

1. A drivetrain for a motor vehicle, having a friction clutch for transmitting drive torque for the motor vehicle and having an actuator arrangement for actuating the friction clutch, wherein the actuator arrangement has a first actuator which is designed to close the friction clutch quickly with little force expenditure in order to thus quickly close a clearance which is present in the open state of the friction clutch, and a second actuator which is designed such that, with a small stroke, it applies a large force for actuating the friction clutch in order to keep the friction clutch closed with little energy expenditure, wherein the actuator arrangement has a first pump and a second pump which have different hydraulic transmission ratios and are directly connected to the friction clutch, the first actuator having the first pump, and the second actuator having the second pump, wherein the first pump and the second pump are driven together by one motor having a common output shaft, wherein an outlet of the first pump and an outlet of the second pump are connected to one another at a connecting point which is connected to the friction clutch, wherein a non-return valve is arranged between the first pump and the connecting point, and wherein the first pump is connected via an overrunning clutch to the output shaft.

2. The drivetrain according to claim 1, wherein the actuator arrangement has an electric motor and a mechanism with two different transmission ratios, the first actuator having the electric motor and the mechanism with the first transmission ratio, and the second actuator having the electric motor and the mechanism with the second transmission ratio.

3. The drivetrain according to claim 1, wherein the outlet pressure of the first pump is limited to a limit pressure by means of a pressure limiting arrangement.

4. The drivetrain according to claim 3, wherein the outlet of the first pump and the outlet of the second pump are connected to one another at a connecting point which is connected to the fiction clutch and wherein the limit pressure defines the switching pressure above which only the outlet of the second pump is connected to the friction clutch.

5. The drivetrain according to claim 1, wherein the friction clutch can be switched to an unpressurized state by means of an electrically controlled valve.

6. The drivetrain according to claim 1, wherein the friction clutch is connected via an orifice to a tank.

7. The drivetrain according to claim 1, wherein the first and the second pumps are integrated in a housing which can be flanged directly to an electric drive motor.

8. The drivetrain according to claim 7, wherein the outlet pressure of the first pump is limited to a limit pressure by means of a pressure limiting arrangement, and the pressure limiting arrangement and the non-return valve are integrated into the housing.

9. The drivetrain according to claim 1, wherein the first pump and the second pump are integrated in one pump.

10. The drivetrain according to claim 9, wherein the integrated pump is embodied as a planetary gearwheel pump and has two pressure kidneys.

11. A drivetrain for a motor vehicle, having a friction clutch for transmitting drive torque for the motor vehicle and having an actuator arrangement for actuating the friction clutch, wherein the actuator arrangement has a first actuator which is designed to close the friction clutch quickly with little force expenditure in order to thus quickly close a clearance which is present in the open state of the friction clutch, and a second actuator which is designed such that, with a small stroke, it applies a large force for actuating the friction clutch in order to keep the friction clutch closed with little energy expenditure, the first actuator having a first pump and the second actuator having a second pump, the first pump being designed to displace a larger fluid quantity at a lower pressure than the second pump, and the first and second pumps being embodied as rotary screw pumps, wherein the first pump and the second pump are directly connected to the friction clutch, wherein the first pump and the second pump are integrated in one pump, and wherein the integrated pump is embodied as a planetary gearwheel pump and has two pressure kidneys, wherein a first pressure kidney is assigned to the first pump and the second pressure kidney is assigned to the second pump.

* * * * *